(12) United States Patent
Enserink et al.

(10) Patent No.: US 7,833,620 B2
(45) Date of Patent: Nov. 16, 2010

(54) APPARATUS FOR GLUING AN OBJECT TO A SURFACE BY MEANS OF TWO OR MORE COMPONENT GLUE

(75) Inventors: Anton Rudolf Enserink, Rotterdam (NL); Sander Schulp, S'Gravenhage (NL)

(73) Assignee: IR. A.R. Enserink Holding BV, Rotterdam (NL)

( * ) Notice: Subject to any disclaimer, the term of this patent is extended or adjusted under 35 U.S.C. 154(b) by 897 days.

(21) Appl. No.: 11/576,508

(22) PCT Filed: Oct. 7, 2005

(86) PCT No.: PCT/NL2005/000727

§ 371 (c)(1),
(2), (4) Date: Apr. 2, 2007

(87) PCT Pub. No.: WO2007/021170

PCT Pub. Date: Feb. 22, 2007

(65) Prior Publication Data

US 2009/0022976 A1    Jan. 22, 2009

(30) Foreign Application Priority Data

Oct. 7, 2004    (NL) .................................. 1027196

(51) Int. Cl.
*B32B 3/26* (2006.01)
(52) U.S. Cl. ................. 428/321.1; 248/205.3; 248/304; 411/82.3
(58) Field of Classification Search ............... 428/321.1, 428/321.5; 248/205.3, 304; 411/82.3
See application file for complete search history.

(56) References Cited

U.S. PATENT DOCUMENTS

| 3,532,316 | A | * | 10/1970 | Mathes | ..................... 248/205.3 |
| 4,425,065 | A | * | 1/1984 | Sweeney | ..................... 411/23 |
| 6,468,010 | B2 | * | 10/2002 | Sager et al. | ................... 411/82 |

FOREIGN PATENT DOCUMENTS

| EP | 900944 A1 | * | 3/1999 |
| GB | 442832 | * | 2/1936 |
| WO | WO 9509548 A1 | * | 4/1995 |
| WO | WO 9604483 A1 | * | 2/1996 |

* cited by examiner

*Primary Examiner*—Mark Ruthkosky
*Assistant Examiner*—Gerard T Higgins
(74) *Attorney, Agent, or Firm*—Ryan A. Schneider, Esq.; Troutman Sanders LLP

(57) ABSTRACT

A device for attaching an object to a substrate by means of glue includes at least one part (21) provided with a breakable sealed cavity, each containing one of the glue components, and one or more cavities (22) in the device (20), which are filled with the remaining glue components, where the parts (20, 21) are movable relative to each other like a piston pump, which makes the glue components flow towards a gluing surface (24, 42) through a system of channels (29, 30) and optionally through mixing chambers (31) and where the breakable seal (26) is broken by this movement. In order not to obstruct an equal flow of glue components, the device according to the invention comprises a cam (27) and a seal storing chamber (35) to store the seal away from the flow after it is broken.

10 Claims, 1 Drawing Sheet

APPARATUS FOR GLUING AN OBJECT TO A SURFACE BY MEANS OF TWO OR MORE COMPONENT GLUE

CROSS-REFERENCES TO RELATED APPLICATIONS

This application is a US National Stage of International Application No. PCT/NL2005/000727, filed 7 Oct. 2005, which claims the benefit of NL 1027196, filed 7 Oct. 2004.

The invention relates to a device for attaching an object to a substrate by means of glue.

The device hereto includes at least one part provided with a glue containing cavity, which part together with a cavity in the device comprises a push or screw activated pump which drives out the glue through a system of one or more channels to a gluing surface on an object or the device.

Such a device is known from the patent with number GB442832. The device according to this patent can be equipped with a breakable glue filled capsule, which breaks when the device is screwed or pushed, releasing the glue through a system of channels towards a gluing surface.

A known drawback of such breakable capsules is that they remain inside the cavities during the expulsion of the glue, in such a way that they can prevent even flowing of the glue, causing unequal flow through the system of channels, which in turn causes an unequal spread of glue on the gluing surface and therewith insufficient bonding, with an increased risk for incomplete expulsion of the glue. With the use of multiple capsules containing different glue components of a two- or more component glue, the presence of broken capsules can lead to not only unequal and insufficient spreading, but also to wrong proportions and insufficient mixing of the components, which prevents optimal hardening of the glue, which causes unreliable bonding.

The invention intends to let the glue components flow in such a way, that the flow of the glue components towards the gluing surface is complete, in the right dosage, evenly spread and fully mixed.

The device according to the invention hereto contains multiple cavities that can contain the glue components of a two- or more component glue system, which cavities are made in different, with respect to each other movable, parts of the device, which parts are shaped in such a way, that the cavity volumes are reduced along with the movement, which builds up pressure inside the glue components, which pressure drives out the glue components to eventually flow to the gluing surface.

To adequately separate the glue components from each other to avoid premature curing of the components, the cavities can be shielded with a breakable seal. This seal can, according to the invention, be placed in such a way that by placing a sealed part, another part of the device is also sealed.

In order not to obstruct the flow of the glue components, the invention includes a guide which stores the seal of a glue filled cavity away from the flow pattern when the seal is broken. Next to this, the invention offers the possibility to apply very fast curing glue systems, because the flow channels merge in a mixing chamber which is located very close to the gluing surface, which will only allow the glue components to start curing right at the moment they flow to the gluing surface. The presence of such a mixing chamber is specifically useful for those fast curing multi-component glue systems that need thorough mixing.

Specific embodiments of the invention are recorded in the claims.

A specific embodiment of the invention based on two component glue, which is particularly suitable for glue systems with a high thixotropy or a high degree of fillers or weight reducing additives, where the movement of the different parts relative to each other is activated by a screwing motion, will now be described in FIGS. 1-3, of which:

Figure 4:
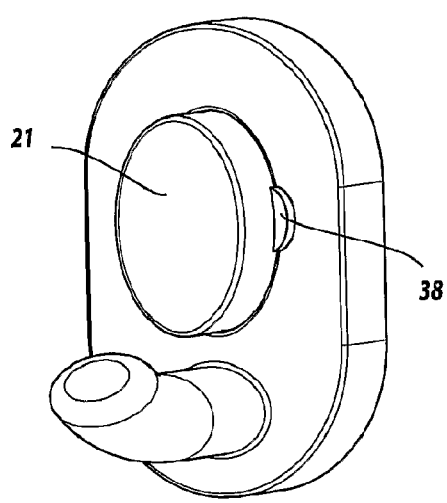
Figure 5:
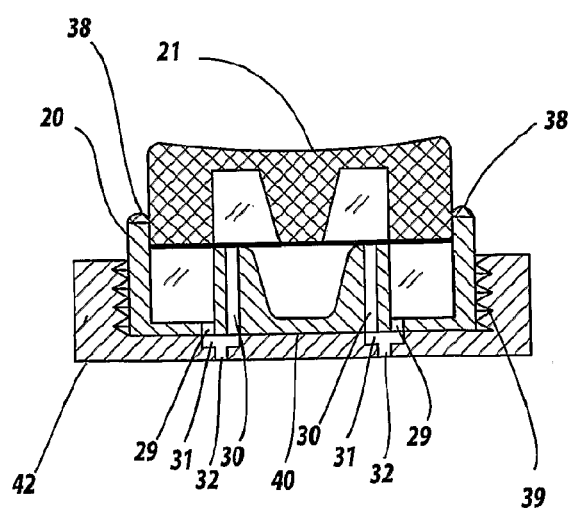

FIGS. 4 and 5 will be explained in the text after FIGS. 1-3.

FIG. 4 shows an alternative embodiment with a translating motion pattern;

FIG. 5 shows a cross section of another embodiment where the glue-containing parts are placed separately in an object for gluing.

Figure 1:
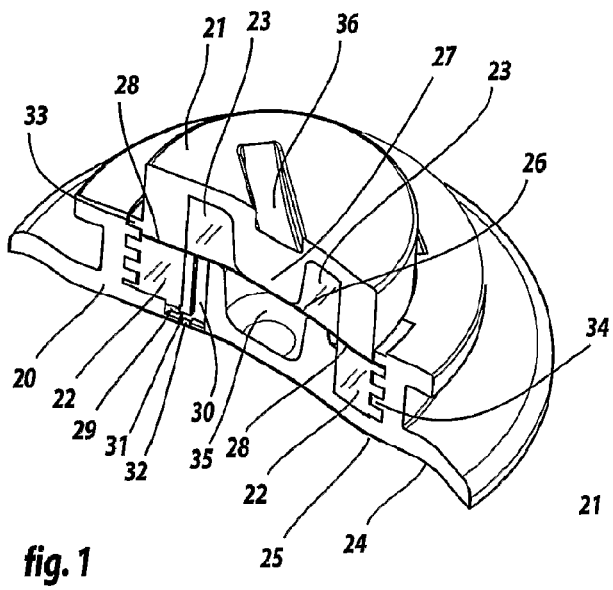
FIG. 1 is a cross-section through the centre of the device in its initial position.
Figure 2:
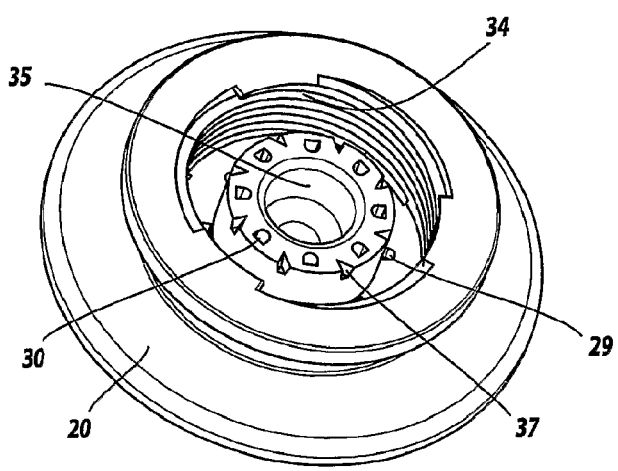
FIG. 2 shows a view on part 20.
Figure 3:
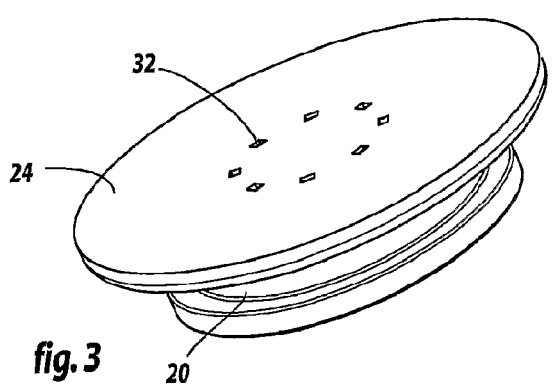
FIG. 3 shows a view on part 20 at the gluing surface.

The device in FIGS. 1-3 comprise the object for gluing, in this case a fastener 20, and a part 21 filled with one of the glue components. Next to this, 22 indicates the glue component present inside the fastener 20, hereafter referred to as component A, and 23 the glue component present inside part 21, hereafter referred to as component B. 24 indicates the gluing surface of the fastener 20, and 25 a removable seal placed on the gluing surface 24. Further, 26 indicates a breakable seal, 27 a cam which is molded on the glue filled part 21, and a circumferential planar face 28 of the glue filled part 21. This breakable seal 26 is welded or glued firmly to the glue filled part 21 at the cam 27 and the circumferential face 28, creating a durable and hermetic barrier of component B. Further, 29 indicates one of the channels of component A, and 30 one of the channels of component B, where it is evident that both systems of channels are paired in such a way that channels 29 and 30 are always located close to each other.

31 indicates one of the mixing chambers having one of the channels of both component A and B merging into it, and 32 one of the openings to gluing surface 24. In an alternative embodiment, the mixing chambers 31 and the openings 32 can be left out, for instance in case a multi-component glue system is used that is not depending on complete mixing, as is the case with catalytic reacting glues. In this alternative embodiment the channels 29 and 30 merge directly to the gluing surface 24. Next to this, 33 indicates a system of outer threads attached to part 21, and 34 a corresponding system of inner threads attached to the fastener 20. The figure shows that both threads 33 and 34 are turned in about one lead. 35 indicates a seal storing chamber, and 36 a drive system for turning equipment.

FIG. 2 shows the fastener 20 from FIG. 1, showing some of the channels of component A 29 and the complete system of channels of component B 30. Further, the system of inner threads 34 as well as the seal storage chamber 35 can be seen. Next to this, a system of sharp notches is visible, which are positioned opposite to the breakable seal 26 in the initial position, at the edge of the circumferal face 28.

FIG. 3 again shows the fastener 20 from FIG. 1, now in a view at the gluing surface 24. Here, the system of openings 32 can be seen.

To glue the fastener 20 to a substrate, one removes the seal 25, and holds the device against a substrate. By turning the glue component filled part 21 clockwise relative to the fastener 20, for instance by using a turning tool in drive 36, the thread systems 33 and 34 force the glue filled part 21 towards the gluing surface 24, causing the breakable seal 26 to break at the edge of the circumferal plane 28. In order to assist in breaking the seal easily and without the use excessive force, the system of sharp notches 37 cuts the seal at multiple places. Because the the breakable seal 26 is fixed to the cam 27, it will be moved into the seal storage chamber 35 in such a way, that it is kept away from the channels for component B 30, making it impossible for the seal to obstruct the flow of component B. By turning part 21 containing glue component B clockwise, pressure is build up inside both components A and B of the glue system, because the parts 20 and 21 slide into each other in a way similar to a double action piston pump. The glue components A and B are released through their respective systems of channels 29 and 30, causing these glue components to mix together in the system of mixing chambers 31, to further arrive at the gluing surface 24 as activated glue compound. During the clockwise rotation of part 21, the device can be placed against against the substrate, which causes the glue compound to spread between the gluing surface and the substrate, so that an adequate adhesive joint can be accomplished.

FIG. 4 shows another embodiment in its initial position, where the device according to the invention is placed in an adhesive bonded object of use 20, in this case a towel hook. The movably positioned part 21 which contains a glue component here has the shape of a push-button, which drives out the glue components with a translating in stead of a screwing motion, and includes a removable safety pin 38. Note that in this example part 21 is not round, like part 21 in the embodiment described in FIGS. 1-3, but elliptical. The internal layout of the device is similar to the variant described in FIGS. 1-3, with omission of threads 33 and 34, and the drive for a turning tool 36. The device according to this embodiment is activated by placing the adhesive bonded object, after removing the safety pin 38, at the right spot on the substrate, and by pushing in the push-button shaped glue component containing movably positioned part 21. Such an embodiment can achieve quicker driving out of the glue, because the movement of the pistons is quicker than the screwing version described in FIGS. 1-3. Further, a translating movement is not bound to circular and concentrically placed shapes, making it possible to arrange the systems of channels, mixing chambers and openings in a different pattern to better suit the shape and load of the adhesive bonded object by a dedicated distribution of the glue over the gluing surface. A further alternative embodiment is constructed in such a way that the safety pin is cut off by applying the initial pressure on part 21, by pushing it against an edge of the device. Finally, FIG. 5 shows a cross section of an embodiment of the device according to the invention, in its initial position, and where part 21, in a similar fashion as shown in FIG. 4, is implemented as push-button, and where safety pin 38 is shaped like a circumferal sealing flange. Such a sealing flange can hermetically shut off glue component A if the device is in its initial position.

In the embodiment of FIG. 5, the complete device is placed inside a cavity 40 provided with an inner thread 39 of the adhesive bonded object, which cavity together with the device constitute a system of mixing chambers 31, where the channels 29 and 30 merge in a system of openings in the gluing surface indicated with 42 of the adhesive bonded object. The embodiment shown in this figure can, similarly to the embodiment of FIG. 4, be activated by pushing in part 21 completely, causing the glue components to arrive thoroughly mixed at the gluing surface. The inserted parts of the device 20 and 21 can be removed from the cavity 40 after the glue has flowed out, so that an object provided with an outer thread matching inner thread 39 can be screwed in. An alternative embodiment of the invention has no inner thread, where the inserted part 20 and 21 can be left in the cavity 40 or taken out of it. Another alternative embodiment of the invention has no collar on the adhesive bonded object which creates cavity 40, but is flat at the location of the device according to the invention.

One can imagine that a larger object is equipped with multiple sets of collaborating parts 20 and 21, where for the adequate operation required, precision of the inserting parts is condensed in relatively small parts, which can be mass-manufactured, filled with glue components and sealed precisely and economically.

The invention consequently provides a device for quick and secure adhesive bonding of objects with multi-component glue.

The invention claimed is:

1. A device for gluing an object to a substrate, wherein the device may be the object, the device comprising: two or more movably positioned parts provided with two or more cavities each of which cavity contains one of the components of a multi-component glue, wherein the two or more movably positioned parts are formed in such a way that when the two or more movably positioned parts are moved, the components of the multi-component glue will flow towards a gluing surface through a system of two or more channels, and wherein the two or more movably positioned parts are provided with a breakable seal, which breaks with an initiation of a movement of the two or more movably positioned parts, and is held out of the flow of the components of the multi-component glue during the movement of the two or more movably positioned parts by means of a cam.

2. The device according to claim 1, wherein the two or more channels merge at the gluing surface.

3. The device according to claim 1, wherein the two or more channels merge at a mixing chamber which has an opening to the gluing surface.

4. The device according to claim 1, wherein the breakable seal is fixed to the cam.

5. The device according to claim 1, wherein breaking of the breakable seal is promoted by a system of one or more sharp notches.

6. The device according to claim 1, wherein the breakable seal can seal off multiple glue-containing cavities.

7. The device according to claim 1, wherein one or more of the device of claim 1 can be added as a separate assembly to the object to be glued.

8. The device according to claim 7, wherein the one or more of the device of claim 1 can be removed from the object to be glued after the glue has flowed out.

9. An article of use provided with one or more devices according to claim 1.

10. The article according to claim 9, wherein the article is a towel hook.

* * * * *